(12) United States Patent
Cheng et al.

(10) Patent No.: US 11,370,911 B2
(45) Date of Patent: Jun. 28, 2022

(54) LASER PLATABLE THERMOPLASTIC COMPOSITIONS WITH A LASER ACTIVATABLE METAL COMPOUND AND SHAPED ARTICLES THEREFROM

(71) Applicant: SHPP Global Technologies B.V., Bergen op Zoom (NL)

(72) Inventors: Yunan Cheng, Shanghai (CN); Shijie Song, Shanghai (CN); Jian Wang, Shanghai (CN)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 554 days.

(21) Appl. No.: 16/476,757

(22) PCT Filed: Jan. 10, 2018

(86) PCT No.: PCT/IB2018/050156
§ 371 (c)(1),
(2) Date: Jul. 9, 2019

(87) PCT Pub. No.: WO2018/130952
PCT Pub. Date: Jul. 19, 2018

(65) Prior Publication Data
US 2019/0352503 A1    Nov. 21, 2019

Related U.S. Application Data

(60) Provisional application No. 62/444,870, filed on Jan. 11, 2017.

(51) Int. Cl.
| | |
|---|---|
| C08L 71/12 | (2006.01) |
| B29C 35/08 | (2006.01) |
| B29C 45/00 | (2006.01) |
| C08L 23/10 | (2006.01) |
| C23C 18/16 | (2006.01) |
| C23C 18/20 | (2006.01) |
| B29K 23/00 | (2006.01) |
| B29K 509/02 | (2006.01) |
| B29L 31/34 | (2006.01) |

(52) U.S. Cl.
CPC ........ *C08L 71/123* (2013.01); *B29C 35/0805* (2013.01); *B29C 45/0001* (2013.01); *C08L 23/10* (2013.01); *C23C 18/1641* (2013.01); *C23C 18/204* (2013.01); *B29C 2035/0838* (2013.01); *B29K 2023/12* (2013.01); *B29K 2509/02* (2013.01); *B29L 2031/3456* (2013.01); *C08L 2203/20* (2013.01); *C08L 2205/06* (2013.01); *C08L 2207/04* (2013.01)

(58) Field of Classification Search
CPC .... C08L 71/123; C08L 23/10; B29C 35/0805; B29C 45/0001; B29C 33/565; B29C 43/183; B29C 44/181; B29C 2035/0838; B29C 64/135; B29C 64/153; B29C 65/16; B29C 65/7473; B29C 2791/009
See application file for complete search history.

(56) References Cited

U.S. PATENT DOCUMENTS

| | | | |
|---|---|---|---|
| 8,309,640 B2 | 11/2012 | Li et al. | |
| 9,074,070 B2 | 7/2015 | Yung et al. | |
| 2009/0170985 A1* | 7/2009 | Ai | C08L 67/02 524/100 |
| 2012/0276390 A1 | 11/2012 | Qiang et al. | |
| 2014/0296410 A1 | 10/2014 | Yunan et al. | |
| 2014/0296411 A1 | 10/2014 | Yunan et al. | |
| 2014/0353543 A1* | 12/2014 | Wu | H05K 3/105 252/75 |
| 2015/0035720 A1 | 2/2015 | Bernardus et al. | |
| 2016/0185958 A1 | 6/2016 | Jung et al. | |

FOREIGN PATENT DOCUMENTS

| | | | |
|---|---|---|---|
| CN | 105230133 A | | 1/2016 |
| CN | 105531309 A | | 4/2016 |
| CN | 105733234 A | | 7/2016 |
| DE | 102013007750 | * | 5/2013 |
| KR | 20150073093 A | | 6/2015 |
| KR | 2016-0005742 A | | 1/2016 |
| KR | 2016-0016957 A | | 2/2016 |
| WO | WO 2009/141800 A2 | | 11/2009 |
| WO | WO 2014/162254 A1 | | 10/2014 |
| WO | WO 2016/002660 A1 | | 1/2016 |

OTHER PUBLICATIONS

International Patent Application PCT/IB2018/050156; Int'l Search Report and the Written Opinion; dated May 17, 2018; 16 pages.
International Patent Application PCT/IB2018/050156; Int'l Preliminary Report on Patentability; dated Jul. 25, 2019; 11 pages.

* cited by examiner

*Primary Examiner* — Stella K Yi
(74) *Attorney, Agent, or Firm* — Quicker Law, LLC

(57) ABSTRACT

Disclosed herein are thermoplastic composition comprising (a) about 15 wt % to about 95 wt % polymer component comprising: (i) either about 20 wt % to about 85 wt % poly(p-phenylene oxide) and about 10 wt % to about 65 wt % flow promoter or about 70 wt % to 100 wt % polypropylene, said polypropylene being homopolymer and/or copolymer; and (ii) greater than about 0 wt % to about 30 wt % impact modifier; (b) about 2 wt % to about 50 wt % of a laser activatable additive having a core-shell structure, wherein the core comprises an inorganic filler and the shell comprises a laser activatable component; and (c) about 3 wt % to about 70 wt % inorganic fillers.

18 Claims, No Drawings

LASER PLATABLE THERMOPLASTIC COMPOSITIONS WITH A LASER ACTIVATABLE METAL COMPOUND AND SHAPED ARTICLES THEREFROM

CROSS-REFERENCE TO RELATED APPLICATION

This application is the National Stage of International Application No. PCT/IB2018/050156 filed Jan. 10, 2018, which claims the benefit of U.S. Provisional Application No. 62/444,870 filed Jan. 11, 2017, the disclosures of which are incorporated herein by this reference in their entireties.

TECHNICAL FIELD

The disclosure concerns platable thermoplastic laser direct structuring compositions and shaped articles made therefrom.

BACKGROUND

Laser direct structuring (LDS), a new Molded Interconnect Device (MID) technology that can produce conductive path structures on a non-conductive plastic surface, has been widely used in electronic application areas such as antenna and circuit. Compared to the conventional methods, such as hot stamping and 2-shot molding, LDS has advantages in design capability, cycle time, cost efficiency, miniaturization, diversification, and functionality of the antenna. Therefore, LDS has been adopted as the major trend in the electronic industry.

For the antenna application, the antenna size is decided by the working frequency and dielectric property of the antenna substrates. The working frequency is usually fixed for a specific application, thus the size of the antenna can be adjusted by tuning the dielectric property of the substrates. Theoretically, the higher the dielectric constant (Dk), the smaller the antenna size. Considering that the future RF device design will be more and more integrated and have less space for multi-antennas, the miniaturization of antenna size is important. However, to make the thermoplastics with high Dk performance, high inorganic filler loading is required which can induce the decrease of mechanical properties of the products, especially the impact strength. That means the thermoplastics become a little brittle, which is not good for the practical applications. Thus, it will be very important for the high Dk LDS polymer grades to be developed with good impact performance. To address this problem, the current disclosure was developed to offer a new solution to make LDS-capable thermoplastic compositions, which have good dielectric performance, mechanical properties, and processing performance.

SUMMARY

The present disclosure satisfies these and other needs by providing ultrahigh performance thermoplastic polymer compositions which integrate high dielectric constant with laser direct structuring function, thus greatly expanding the scope of laser direct structuring technology.

In one aspect, the present disclosure pertains to blended thermoplastic compositions comprising:
(a) about 15 wt % to about 95 wt % polymer component comprising:
  (i) either
  about 20 wt % to about 85 wt % poly(p-phenylene oxide) and about 10 wt % to about 65 wt % flow promoter; or
  about 70 wt % to 100 wt % polypropylene, said polypropylene being homopolymer and/or copolymer; and
  (ii) greater than about 0 wt % to about 30 wt % impact modifier;
(b) about 2 wt % to about 50 wt % of a laser activatable additive having a core-shell structure, wherein the core comprises an inorganic filler and the shell comprises a laser activatable component; and (c) about 3 wt % to about 70 wt % inorganic fillers;
wherein the weight percent values of (a), (b) and (c) are based on the total weight of the composition and the combined weight percent value of all the components does not exceed 100 wt %.

In one aspect, the present disclosure pertains to methods of improving thermal conductivity properties of blended thermoplastic compositions, the method comprising the step of combining:
(a) about 15 wt % to about 95 wt % polymer component comprising:
  (i) either
  about 20 wt % to about 85 wt % poly(p-phenylene oxide) and about 10 wt % to about 65 wt % flow promoter; or
  about 70 wt % to 100 wt % polypropylene, said polypropylene being homopolymer and/or copolymer; and
  (ii) greater than about 0 wt % to about 30 wt % impact modifier;
(b) about 2 wt % to about 50 wt % of a laser activatable additive having a core-shell structure, wherein the core comprises an inorganic filler and the shell comprises a laser activatable component; and
(c) about 3 wt % to about 70 wt % inorganic filler;
wherein the weight percent values of (a), (b) and (c) are based on the total weight of the composition and the combined weight percent value of all the components does not exceed 100 wt %.

In various further aspects, the disclosure relates to articles comprising the disclosed compositions.

DETAILED DESCRIPTION

The present disclosure can be understood more readily by reference to the following detailed description of the disclosure and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present disclosure, example methods and materials are now described.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

All publications mentioned herein are incorporated herein by reference to, for example, disclose and describe the methods and/or materials in connection with which the publications are cited.

Definitions

It is also to be understood that the terminology used herein is for the purpose of describing particular aspects only and is not intended to be limiting. As used in the specification and in the claims, the term "comprising" can include the aspects "consisting of" and "consisting essentially of." Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a polyamide polymer" includes mixtures of two or more polyamide polymers.

As used herein, the term "combination" is inclusive of blends, mixtures, reaction products, and the like.

Ranges can be expressed herein as from one value (first value) to another value (second value). When such a range is expressed, the range includes in some aspects one or both of the first value and the second value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the designated value, approximately the designated value, or about the same as the designated value. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optionally substituted alkyl" means that the alkyl group can or cannot be substituted and that the description includes both substituted and unsubstituted alkyl groups.

Disclosed are the components to be used to prepare the compositions of the disclosure as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

References in the specification and concluding claims to parts by weight of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

As used herein the terms "weight percent," "wt %," and "wt. %," which can be used interchangeably, indicate the percent by weight of a given component based on the total weight of the composition, unless otherwise specified. That is, unless otherwise specified, all wt % values are based on the total weight of the composition. It should be understood that the sum of wt % values for all components in a disclosed composition or formulation are equal to 100.

As used herein, the terms "weight average molecular weight" or "Mw" can be used interchangeably, and are defined by the formula:

$$M_w = \frac{\sum N_i M_i^2}{\sum N_i M_i},$$

where $M_i$ is the molecular weight of a chain and $N_i$ is the number of chains of that molecular weight. Compared to $M_n$, $M_w$ takes into account the molecular weight of a given chain in determining contributions to the molecular weight average. Thus, the greater the molecular weight of a given chain, the more the chain contributes to the $M_w$. $M_w$ can be determined for polymers, e.g. polycarbonate polymers, by methods well known to a person having ordinary skill in the art using molecular weight standards, e.g. polycarbonate standards or polystyrene standards, preferably certified or traceable molecular weight standards.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

Blended Thermoplastic Compositions

In one aspect, the present disclosure pertains to blended thermoplastic compositions comprising:

(a) about 15 wt % to about 95 wt % polymer component comprising:
  (i) either
    about 20 wt % to about 85 wt % poly(p-phenylene oxide) and about 10 wt % to about 65 wt % flow promoter; or
    about 70 wt % to 100 wt % polypropylene, said polypropylene being homopolymer and/or copolymer; and
  (ii) greater than about 0 wt % to about 30 wt % impact modifier;
(b) about 2 wt % to about 50 wt % of a laser activatable additive having a core-shell structure, wherein the core comprises an inorganic filler and the shell comprises a laser activatable component; and
(c) about 3 wt % to about 70 wt % inorganic fillers;

wherein the weight percent values of (a), (b) and (c) are based on the total weight of the composition and the combined weight percent value of all the components does not exceed 100 wt %.

In various aspects, the compositions of the present disclosure further comprise an additive selected from coupling agents, antioxidants, mold release agents, UV absorbers, light stabilizers, heat stabilizers, lubricants, plasticizers, pigments, dyes, colorants, anti-static agents, nucleating agents, anti-drip agents, acid scavengers, and combinations of two or more of the foregoing. In a further aspect, compositions of the present disclosure further comprise at least one additive selected from a flame retardant, a colorant, a primary anti-oxidant, and a secondary anti-oxidant.

Polymer Component

In one aspect, the blended thermoplastic compositions of the present disclosure comprise at least one polymer component present in an amount from about 15 wt % to about 95 wt %. In various aspects, the polymer component comprises polypropylene, polyethylene, ethylene based copolymer, polycarbonate (PC), polyamide, polyester, polyoxymethylene (POM), polybutylene terephthalate (PBT), polyethylene terephthalate (PET), polycyclohexylendimethylene terephthalate (PCT), liquid crystal polymers (LPC), polyphenylene sulfide (PPS), polyphenylene ether (PPE), polyphenylene oxide-polystyrene blends, polystyrene, high impact modified polystyrene, acrylonitrile-butadiene-styrene (ABS) terpolymer, acrylic polymer, polyetherimide (PEI), polyurethane, polyetheretherketone (PEEK), poly ether sulphone (PES), polyphthalamide (PPA) or mixtures thereof. In a further aspect, the polymer component comprises a polypropylene, a polyethylene, an ethylene-based copolymer, a polycarbonate, a polyamide, a polyester, a polyoxymethylene ("POM"), a liquid crystal polymer ("LCP"), a polyphenylene sulfide ("PPS"), a polyphenylene ether ("PPE"), a polystyrene, a acrylonitrile-butadiene-styrene terpolymer ("ABS"), an acrylic polymer, a polyetherimide ("PEI"), a polyurethane, a polyethersulphone ("PES"), or a polyetheretherketone ("PEEK"), or combinations thereof.

Some preferred aspects utilize polypropylene or poly(p-phenylene oxide) polymer. In some aspects, the polypropylene can be a homopolymer and/or a copolymer. A homopolymer essentially comprises propylene monomers. In certain aspects, the polypropylene copolymer comprises propylene monomers copolymerized with ethylene. The copolymer may be a random copolymer or a block copolymer. Some polypropylene copolymers comprise about 1 to about 15 mol % ethylene or about 1 to about 7 mol % or about 5 to about 15 mol % ethylene.

Some preferred aspects utilize about 20 wt % to about 85 wt % poly(p-phenylene oxide) polymer. Other aspects utilize about 30 wt % to about 85 wt % poly(p-phenylene oxide) polymer or about 35 wt % to about 75 wt % poly(p-phenylene oxide) polymer.

Laser Direct Structuring Additive

In addition to the thermoplastic resin, the compositions of the present disclosure also include a laser direct structuring (LDS) additive. The LDS additive is selected to enable the composition to be used in a laser direct structuring process. In an LDS process, a laser beam exposes the LDS additive to place it at the surface of the thermoplastic composition and to activate metal atoms from the LDS additive. As such, the LDS additive is selected such that, upon exposed to a laser beam, metal atoms are activated and exposed and in areas not exposed by the laser beam, no metal atoms are exposed. In addition, the LDS additive is selected such that, after being exposed to laser beam, the etching area is capable of being plated to form conductive structure.

As used herein "capable of being plated" refers to a material wherein a substantially uniform metal plating layer can be plated on laser-etched area. This process is different than laser marking wherein the main outcome of laser marking is a color change in the material under the effect of energy radiation. The key characterization for laser marking is the contrast between the mark and the substrate.

Plating index is defined as the ratio between average copper thickness obtained under a specific laser parameter of the tested sample and that of the reference sample. The reference sample was a PBT based LDS with commercial name of Pocan DP 7102. A plating index of over 0.7 is preferred.

Conversely, for LDS, the goal is the formation of metal seeds on the laser etched surface, and the final metallization layer during the following plating process. Plating rate and adhesion of plated layers are the key evaluation requirements. Color here means the substrate made from these materials itself not the color change under the laser radiation. As such, in addition to enabling the composition to be used in a laser direct structuring process, the LDS additive used in the present disclosure is also selected to help enable the composition to be colored while maintaining physical properties.

LDS compounds used in the instant disclosure have a core/shell structure where a core is coated with a laser activatable component. The 'laser activatable component' is a component that releases metal seeds after laser activating. The metal seeds act as catalysts for chemical plating.

In some preferred aspects, the core of the LDS additive is essentially completely covered with the shell component. In a typical aspect, the core and the shell are of a different composition.

In some aspects, the shell component has a thickness of from about 1 nanometer (nm) to about 50 micrometers (microns) (μm). In certain aspects, the core has a mean particle size of about 50 nm to about 500 μm.

In some aspects, the core comprises an inorganic filler and the shell comprises a laser activatable component comprising one or more of copper and tin. In some preferred aspects, the core and the shell are of different composition. In some aspects, the core comprises $TiO_2$, mica or talc. In certain aspects, the laser activatable component comprises tin and antimony. Some preferred aspects use a mixed metal oxide comprising tin oxide and antimony. For some compositions, the laser activatable additive comprises about 10 wt % to about 80 wt % core and about 20 wt % to about 90 wt % shell or about 30 wt % to about 70 wt % core and about 30 wt % to about 70 wt % shell, or about 45 wt % to about 65 wt % core and about 35 wt % to about 55 wt % shell. Some shells comprise Tin-Antimony Cassiterite Grey [(Sb/Sn)O2] or copper hydroxide phosphate.

The amount of the LDS additive included is sufficient to enable plating of the track formed after activation by the laser while not adversely affecting mechanical properties.

In a further aspect, the laser direct structure additive is present in an amount from about 1 wt % to about 30 wt %. In a still further aspect, the laser direct structure additive is present in an amount from about 2 wt % to about 20 wt %. In yet a further aspect, the laser direct structure additive is present in an amount from about 7 wt % to about 18 wt %. In an even further aspect, the laser direct structure additive is present in an amount from about 5 wt % to about 15 wt %, or from about 5 wt % to about 10 wt %.

The LDS additive is selected such that, after activating with a laser, the conductive path can be formed by a standard electroless plating process. When the LDS additive is exposed to the laser, elemental metal is released. The laser draws the circuit pattern onto the part and leaves behind a roughened surface containing embedded metal particles. These particles act as nuclei for the crystal growth during a subsequent plating process, such as a copper plating process. Other electroless plating processes that can be used include, but are not limited to, gold plating, nickel plating, silver plating, zinc plating, tin plating or the like.

Flow Promoter

The flow promoter may be present at from about 10 to about 65 wt % as measured against the weight of the polymer component. As some examples, the flow promoter may be present at, e.g., about 10 to about wt %, or from about 11 to about 30 wt %, or from about 12 to about 25 wt % of the polymer component.

Suitable flow promoters may be in particulate form and include, e.g., nylon, polyphthalimide, polystyrene, polypropylene and blends thereof.

Impact Modifier

The impact modifier may be present at from about greater than 0 to about 30 wt % as measured against the weight of the polymer component. As some examples, the flow promoter may be present at, e.g., about 5 to about 25 wt %, or from about 10 to about 30 wt %, or from about 10 to about 20 wt % of the polymer component.

Impact modifiers the impact modifier comprises one or more of styrene-ethylene/1-butene-styrene (SEBS), styrene-butadiene-styrene (SBS), and styrene-ethylene-propylene-styrene (SEPS).

Inorganic Filler

The inorganic filler may be present in an amount of from about 3 wt % to about 70 wt % based on the weight of the thermoplastic composition. In some aspects, the amount is from about 5 wt % to about 30 wt % based on the weight of the thermoplastic composition.

Suitable fillers for the compositions of the disclosure include: silica, clays, calcium carbonate, carbon black, kaolin, and whiskers. Other possible fillers include, for example, silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin comprising various coatings known in the art to facilitate compatibility with the polymeric matrix, or the like; single crystal fibers or "whiskers" such as silicon carbide, alumina, boron carbide, iron, nickel, copper, or the like; fibers (including continuous and chopped fibers) such as asbestos, carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; organic fillers such as polytetrafluoroethylene; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly(vinyl alcohol) or the like; as well as additional fillers and reinforcing agents such as mica, clay, feldspar, flue dust, fillite, quartz, quartzite, perlite, tripoli, diatomaceous earth, carbon black, or the like, or combinations comprising at least one of the foregoing fillers or reinforcing agents.

Optional Polymer Composition Additives

The disclosed polymer compositions can optionally comprise one or more additives conventionally used in the manufacture of molded thermoplastic parts with the proviso that the optional additives do not adversely affect the desired properties of the resulting composition. Mixtures of optional additives can also be used. Such additives can be mixed at a suitable time during the mixing of the components for forming the composite mixture. For example, the disclosed compositions can comprise one or more lubricants, plasticizers, ultraviolet light absorbing additives, anti-dripping agents, dyes, pigments, stabilizers, anti-static agents, flame-retardants, impact modifiers, colorants, antioxidant, and/or mold release agents. In one aspect, the composition further comprises one or more optional additives selected from an antioxidant, flame retardant, and stabilizer. In a further aspect, the composition further comprises a flame retardant.

Exemplary heat stabilizers include, for example, organophosphites such as triphenylphosphite, tris-(2,6-dimethylphenyl)phosphite, tris-(mixed mono- and di-nonylphenyl) phosphite or the like; phosphonates such as dimethylbenzenephosphonate or the like, phosphates such as trimethyl phosphate, or the like, or combinations including at least one of the foregoing heat stabilizers. Heat stabilizers are generally used in amounts of from 0.01 to 0.5 parts by weight based on 100 parts by weight of the total composition, excluding any filler.

Exemplary antioxidants include, for example, organophosphites such as tris(nonyl phenyl)phosphite, tris(2,4-di-t-butylphenyl)phosphite, bis(2,4-di-t-butylphenyl)pentaerythritoldiphosphite, distearylpentaerythritoldiphosphite or the like; alkylated monophenols or polyphenols; alkylated reaction products of polyphenols with dienes, such as tetrakis[methylene(3,5-di-tert-butyl-4-hydroxyhydrocinnamate)] methane, or the like; butylated reaction products of para-cresol or dicyclopentadiene; alkylated hydroquinones; hydroxylatedthiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations including at least one of the foregoing antioxidants. Antioxidants are generally used in amounts of from 0.01 to 0.5 parts by weight, based on 100 parts by weight of the total composition, excluding any filler.

Exemplary light stabilizers include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone or the like or combinations including at least one of the foregoing light stabilizers. Light stabilizers are generally used in amounts of from 0.1 to 1.0 parts by weight, based on 100 parts by weight of the total composition, excluding any filler.

Exemplary plasticizers include, for example, phthalic acid esters such as dioctyl-4,5-epoxy-hexahydrophthalate, tris-(octoxycarbonylethyl) isocyanurate, tristearin, epoxidized soybean oil or the like, or combinations including at least one of the foregoing plasticizers. Plasticizers are generally used in amounts of from 0.5 to 3.0 parts by weight, based on 100 parts by weight of the total composition, excluding any filler.

Exemplary antistatic agents include, for example, glycerol monostearate, sodium stearylsulfonate, sodium dodecylbenzenesulfonate or the like, or combinations of the foregoing antistatic agents. In one aspect, carbon fibers, carbon nanofibers, carbon nanotubes, carbon black, or any combination of the foregoing can be used in a polymeric resin containing chemical antistatic agents to render the composition electrostatically dissipative.

Exemplary mold releasing agents include for example, metal stearate, stearyl stearate, pentaerythritoltetrastearate, beeswax, montan wax, paraffin wax, or the like, or combinations including at least one of the foregoing mold release agents. Mold releasing agents are generally used in amounts of from 0.1 to 1.0 parts by weight, based on 100 parts by weight of the total composition, excluding any filler.

Exemplary UV absorbers include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); 1,3-bis[[(2-cyano-3,3-diphenylacryloyl)oxy]-2,2-bis[[(2-cyano-3,3-diphenylacryloyl)oxy] methyl]propane (UVINUL™ 3030); 2,2'-(1,4-phenylene) bis(4H-3,1-benzoxazin-4-one); 1,3-bis[(2-cyano-3,3-diphenylacryloyl)oxy]-2,2-bis[[(2-cyano-3,3-diphenylacryloyl) oxy]methyl]propane; nano-size inorganic materials such as titanium oxide, cerium oxide, and zinc oxide, all with particle size less than 100 nanometers; or the like, or combinations including at least one of the foregoing UV absorbers. UV absorbers are generally used in amounts of from 0.01 to 3.0 parts by weight, based on 100 parts by weight of the total composition, excluding any filler.

Exemplary lubricants include for example, fatty acid esters such as alkyl stearyl esters, e.g., methyl stearate or the like; mixtures of methyl stearate and hydrophilic and hydrophobic surfactants including polyethylene glycol polymers, polypropylene glycol polymers, and copolymers thereof e.g., methyl stearate and polyethylene-polypropylene glycol copolymers in a suitable solvent; or combinations including at least one of the foregoing lubricants. Lubricants are generally used in amounts of from 0.1 to 5 parts by weight, based on 100 parts by weight of the total composition, excluding any filler.

Exemplary blowing agents include for example, low boiling halohydrocarbons and those that generate carbon dioxide; blowing agents that are solid at room temperature and when heated to temperatures higher than their decomposition temperature, generate gases such as nitrogen, carbon dioxide, ammonia gas, such as azodicarbonamide, metal salts of azodicarbonamide, 4,4' oxybis(benzenesulfonylhydrazide), sodium bicarbonate, ammonium carbonate, or the like, or combinations including at least one of the foregoing blowing agents. Blowing agents are generally used in amounts of from 1 to 20 parts by weight, based on 100 parts by weight of the total composition, excluding any filler.

As noted above, the disclosed polymer compositions can optionally further comprises a flame retardant additive. In various aspects, the flame retardant additive can comprise any flame retardant material or mixture of flame retardant materials suitable for use in the inventive polymer compositions.

In a further aspect, the flame retardant additive comprises a phosphate containing material. In a yet further aspect, the flame retardant additive comprises a phosphate containing material selected from a phosphine, a phosphine oxide, a bisphosphine, a phosphonium salt, a phosphinic acid salt, a phosphoric ester, and a phosphorous ester, or a combination thereof.

In a further aspect, the flame retardant additive comprises a halogen containing material. In other aspects, the flame retardant additive is free of or substantially free of one or more of phosphate and/or a halogen.

In a further aspect, the flame retardant additive comprises an oligomer organophosphorous flame retardant, including for example, bisphenol A diphenyl phosphate (BPADP). In a yet further aspect, the flame retardant is selected from aromatic polyphosphate oligomers, phenoxyphosphazene oligomers, melamine polyphosphate oligomers, and metal phosphinate oligomers, or a combination thereof. In a still further aspect, the flame retardant is selected from oligomeric phosphate, polymeric phosphate, oligomeric phosphonate, or mixed phosphate/phosphonate ester flame retardant compositions. In an even further aspect, the flame retardant is selected from bisphenol-A bis(diphenyl phosphate), 1,3-phenylene tetraphenyl ester, bisphenol-A bis(diphenyl phosphate), red phosphorous, and Clariant Exolite OP series FR, or a combination thereof. In a still further aspect, the flame retardant is selected from triphenyl phosphate; cresyldiphenylphosphate; tri(isopropylphenyl)phosphate; resorcinol bis(diphenylphosphate); and bisphenol-A bis(diphenyl phosphate). In a yet further aspect, the flame retardant is bisphenol-A bis(diphenyl phosphate).

Additionally, materials to improve flow and other properties can be added to the composition, such as low molecular weight hydrocarbon resins. Particularly useful classes of low molecular weight hydrocarbon resins are those derived from petroleum $C_5$ to $C_9$ feedstock that are derived from unsaturated $C_5$ to $C_9$ monomers obtained from petroleum cracking. Non-limiting examples include olefins, e.g., pentenes, hexenes, heptenes and the like; diolefins, e.g., pentadienes, hexadienes and the like; cyclic olefins and diolefins, e.g., cyclopentene, cyclopentadiene, cyclohexene, cyclohexadiene, methyl cyclopentadiene and the like; cyclic diolefindienes, e.g., dicyclopentadiene, methylcyclopentadiene dimer and the like; and aromatic hydrocarbons, e.g., vinyltoluenes, indenes, methylindenes and the like. The resins can additionally be partially or fully hydrogenated.

Methods of Manufacture

The compositions of the present disclosure can be blended with the aforementioned ingredients by a variety of methods involving intimate admixing of the materials with any additional additives desired in the formulation. Because of the availability of melt blending equipment in commercial polymer processing facilities, melt processing methods are generally preferred. Illustrative examples of equipment used in such melt processing methods include: co-rotating and counter-rotating extruders, single screw extruders, co-kneaders, disc-pack processors and various other types of extrusion equipment. The temperature of the melt in the present process is preferably minimized in order to avoid excessive degradation of the resins. It is often desirable to maintain the melt temperature between about 230° C. and about 350° C. in the molten resin composition, although higher temperatures can be used provided that the residence time of the resin in the processing equipment is kept short. In some aspects the melt processed composition exits processing equipment such as an extruder through small exit holes in a die. The resulting strands of molten resin are cooled by passing the strands through a water bath. The cooled strands can be chopped into small pellets for packaging and further handling.

Compositions can be manufactured by various methods. For example, polymer, and/or other optional components are first blended, optionally with fillers in a HENSCHEL-Mixer® high speed mixer. Other low shear processes, including but not limited to hand mixing, can also accomplish this blending. The blend is then fed into the throat of a twin-screw extruder via a hopper. Alternatively, at least one of the components can be incorporated into the composition by feeding directly into the extruder at the throat and/or downstream through a sidestuffer. Additives can also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate can be one-fourth inch long or less as desired. Such pellets can be used for subsequent molding, shaping, or forming.

In one aspect, the laser direct structuring process involves three steps: 1) injection molding, 2) laser structuring, and 3) metallizing.

In a further aspect, during the injection molding step, the laser direct structuring additive and reinforcing filler can be mixed with the thermoplastic polymer. In another aspect, the blend composition further comprises one or more optional additives selected from an antioxidant, flame retardant, inorganic filler, and stabilizer. In a still further aspect, single shot injection molding can be used to produce the parts or articles to be laser structured. In at least one aspect, the polymer composition can be mixed at this step and used in the LDS process. In another aspect, additional ingredients can be added to the polymer composition after this step.

In a further aspect, during the laser structuring step, a laser is used to form a conductive path during the laser structuring step. In a still further aspect, the laser used to form a conductive path is laser direct structuring. In a yet further aspect, laser direct structuring comprises laser etching. In an even further aspect, laser etching is carried out to provide an activated surface.

In a further aspect, at least one laser beam draws at least one pattern on the surface of the polymer composition during the laser structuring step. In a still further aspect, the employed filler composition can release at least one metallic nucleus. In a yet further aspect, the at least one metallic nucleus that has been released can act as a catalyst for reductive copper plating process.

Laser direct structuring is can be carried out on an article comprising the disclosed blended thermoplastic compositions at a power setting from about 1 watt (W) to about 14 W, a frequency from about 30 kilohertz (kHz) to about 120 kHz, and a speed of about 1 meters per second (m/s) to about 5 m/s. In a further aspect, laser etching is carried out at about 1 W to about 10 W power with a frequency from about 30 kHz to about 110 kHz and a speed of about 1 m/s to about 5 m/s. In a still further aspect, laser etching is carried out at about 1 W to about 10 W power with a frequency from about 40 kHz to about 100 kHz and a speed of about 2 m/s to about 4 m/s. In a yet further aspect, laser etching is carried out at about 3.5 W power with a frequency of about 40 kHz and a speed of about 2 m/s.

In various aspects, laser direct structuring is carried out on an article comprising the disclosed blended thermoplastic compositions at a power setting of about 2 W. In a further aspect, laser direct structuring is carried out on an article comprising the disclosed blended thermoplastic compositions at a power setting of about 3 W. In a still further aspect, laser direct structuring is carried out on an article comprising the disclosed blended thermoplastic compositions at a power setting of about 4 W. In a yet further aspect, laser direct structuring is carried out on an article comprising the disclosed blended thermoplastic compositions at a power setting of about 5 W. In an even further aspect, laser direct structuring is carried out on an article comprising the disclosed blended thermoplastic compositions at a power setting of about 6 W. In a still further aspect, laser direct structuring is carried out on an article comprising the disclosed blended thermoplastic compositions at a power setting of about 7 W. In a yet further aspect, laser direct structuring is carried out on an article comprising the disclosed blended thermoplastic compositions at a power setting of about 8 W. In an even further aspect, laser direct structuring is carried out on an article comprising the disclosed blended thermoplastic compositions at a power setting of about 9 W. In a still further aspect, laser direct structuring is carried out on an article comprising the disclosed blended thermoplastic compositions at a power setting of about 10 W. In a yet further aspect, laser direct structuring is carried out on an article comprising the disclosed blended thermoplastic compositions at a power setting of about 11 W.

In various aspects, laser direct structuring is carried out on an article comprising the disclosed blended thermoplastic compositions at a frequency setting of about 40 kHz. In a further aspect, laser direct structuring is carried out on an article comprising the disclosed blended thermoplastic compositions at a frequency setting of about 50 kHz. In a still further aspect, laser direct structuring is carried out on an article comprising the disclosed blended thermoplastic compositions at a frequency setting of about 60 kHz. In a yet further aspect, laser direct structuring is carried out on an article comprising the disclosed blended thermoplastic compositions at a frequency setting of about 70 kHz. In an even further aspect, laser direct structuring is carried out on an article comprising the disclosed blended thermoplastic compositions at a frequency setting of about 80 kHz. In a still further aspect, laser direct structuring is carried out on an article comprising the disclosed blended thermoplastic compositions at a frequency setting of about 90 kHz. In a yet further aspect, laser direct structuring is carried out on an article comprising the disclosed blended thermoplastic compositions at a frequency setting of about 100 kHz. In an even further aspect, laser direct structuring is carried out on an article comprising the disclosed blended thermoplastic compositions at a frequency setting of about 110 kHz. In a still further aspect, laser direct structuring is carried out on an article comprising the disclosed blended thermoplastic compositions at a frequency setting of about 120 kHz.

In various aspects, laser direct structuring is carried out on an article comprising the disclosed blended thermoplastic compositions at a speed of about 1 m/s. In a further aspect, laser direct structuring is carried out on an article comprising the disclosed blended thermoplastic compositions at a speed of about 2 m/s. In a still further aspect, laser direct structuring is carried out on an article comprising the disclosed blended thermoplastic compositions at a speed of about 3 m/s. In a yet further aspect, laser direct structuring is carried out on an article comprising the disclosed blended thermoplastic compositions at a speed of about 4 m/s. In an even further aspect, laser direct structuring is carried out on an article comprising the disclosed blended thermoplastic compositions at a speed of about 5 m/s.

In a further aspect, a rough surface can form in the LDS process. In a still further aspect, the rough surface can entangle the copper plate with the polymer matrix in the polymer composition, which can provide adhesion between the copper plate and the polymer composition. The metalizing step can, in various aspects, be performed using conventional techniques. For example, in one aspect, an electroless copper plating bath is used during the metallization step in the LDS process. Thus, in various aspects, plating a metal layer onto a conductive path is metallization. In a still further aspect, metallization can comprise the steps: a) cleaning the etched surface; b) additive build-up of tracks; and c) plating.

In various aspects, the present disclosure pertains to methods of improving dielectric properties of a blended thermoplastic composition, the method comprising the step of combining: from (a) about 15 wt % to about 95 wt % polymer component comprising: (i) either about 20 wt % to about 85 wt % poly(p-phenylene oxide) and about 10 wt % to about 65 wt % flow promoter; or about 70 wt % to 100 wt % polypropylene, said polypropylene being homopolymer and/or copolymer; and (ii) greater than about 0 wt % to about 30 wt % impact modifier; (b) about 2 wt % to about 50 wt % of a laser activatable additive having a core-shell structure; (c) about 3 wt % to about 70 wt % inorganic fillers; wherein the combined weight percent value of all components does not exceed about 100 wt %; wherein all weight percent values are based on the total weight of the composition; wherein a molded sample of the blended thermoplastic composition has a dielectric constant of at least about 3.0 at 1.1 gigahertz (GHz) and a dissipation factor of lower than 0.002 at 1.1 GHz; and wherein a molded sample of the blended thermoplastic composition exhibits a plating index value of at least about 0.5. In some aspects, the plating index value is at least about 0.6 or about 0.7.

Articles of Manufacture

Shaped, formed, or molded articles including the polymer compositions are also provided. The polymer compositions can be molded into useful shaped articles by a variety of means such as injection molding, extrusion, rotational molding, blow molding and thermoforming to form articles such as, for example, personal computers, notebook and portable computers, cell phone antennas and other such communications equipment, medical applications, RFID applications, automotive applications, and the like.

The blended polymer compositions, disclosed herein provide robust plating performance while maintaining good mechanical properties. Evaluation of the mechanical properties can be performed through various tests, such as Izod impact test (notched and/or unnotched), Charpy test, Gardner test, etc., according to several standards (e.g., ASTM D256). Robustness of plating performance can be measured via a performance ranking, or plating ranking, ranging from top performance (e.g., "best") to bottom performance. The ranking can be partitioned in various levels. In one aspect, a plating ranking can have a level of "10" for top performance and a level of "0" for bottom performance.

In a further aspect, the method comprises forming a molded part from the composition. In another aspect, the method further comprises subjecting the molded part to a laser direct structuring process.

In one aspect, the article comprises the product of extrusion molding or injection molding a composition comprising a thermoplastic polymer, a laser directing structuring additive and a reinforcing filler.

In a further aspect, the molded article further comprises a conductive path formed by activation with a laser. In a yet further aspect, the article further comprises a metal layer plated onto the conductive path. In an even further aspect, the metal layer is a copper layer. In a still further aspect, the metal layer has a thickness of about 0.8 micrometers or higher as measured according to ASTM B568.

In various aspects, the polymer composition can be used in the field of electronics. In a further aspect, non-limiting examples of fields which can use the disclosed blended polymer compositions include electrical, electro-mechanical, Radio Frequency (RF) technology, telecommunication, automotive, aviation, medical, sensor, military, and security. In a still further aspect, the use of the disclosed blended polymer compositions can also be present in overlapping fields, for example in mechatronic systems that integrate mechanical and electrical properties which may, for example, be used in automotive or medical engineering.

In one aspect, molded articles according to the present disclosure can be used to produce a device in one or more of the foregoing fields. In a still further aspect, non-limiting examples of such devices in these fields which can use the disclosed blended polymer compositions according to the present disclosure include computer devices, household appliances, decoration devices, electromagnetic interference devices, printed circuits, Wi-Fi devices, Bluetooth devices, GPS devices, cellular antenna devices, smart phone devices, automotive devices, military devices, aerospace devices, medical devices, such as hearing aids, sensor devices, security devices, shielding devices, RF antenna devices, LED devices, or RFID devices. In yet a further aspect, the device is selected from a computer device, electromagnetic interference device, automotive device, medical device, sensor device, security device, shielding device, RF antenna device, LED device and RFID device. In an even further aspect, the device is selected from a computer device, sensor device, security device, RF antenna device, LED device and RFID device. In a still further aspect, the device is selected from a computer device, LED device and RFID device. In yet a further aspect, the device is a LED device. In an even further aspect, the device is a LED lamp.

In a still further aspect, the molded articles can be used to manufacture devices in the automotive field. In a further aspect, non-limiting examples of such devices in the automotive field which can use the disclosed blended polymer compositions in the vehicle's interior include adaptive cruise control, headlight sensors, windshield wiper sensors, and door/window switches. In a further aspect, non-limiting examples of devices in the automotive field which can use the disclosed blended polymer compositions in the vehicle's exterior include pressure and flow sensors for engine management, air conditioning, crash detection, and exterior lighting fixtures.

In a further aspect, the resulting disclosed compositions can be used to provide any desired shaped, formed, or molded articles. For example, the disclosed compositions can be molded into useful shaped articles by a variety of means such as injection molding, extrusion, rotational molding, blow molding and thermoforming. As noted above, the disclosed compositions are particularly well suited for use in the manufacture of electronic components and devices. As such, according to some aspects, the disclosed compositions can be used to form articles such as printed circuit board carriers, burn in test sockets, flex brackets for hard disk drives, and the like.

In various aspects, a molded article comprising the disclosed blended thermoplastic compositions can have a heat deflection temperature from about 100° C. to about 280° C. when determined in accordance with ASTM D648. In a further aspect, a molded article comprising the disclosed blended thermoplastic compositions can have a heat deflection temperature from about 125° C. to about 270° C. when determined in accordance with ASTM D648. In a still further aspect, a molded article comprising the disclosed blended thermoplastic compositions can have a heat deflection temperature of at least 150° C. such as from about 150° C. to about 260° C. when determined in accordance with ASTM D648.

While colorants or dyes or pigments may be used in the present disclosure, they are not required. These colorants may be used because the natural color of the composition is much lighter than previous LDS compositions using an LDS additive that resulted in a composition that was black, or close to black, such that no colorant may have been effective. Accordingly, the compositions of the present disclosure have, in one aspect, an L* value of 40 to 95 or 40 to 85. In an alternative aspect, the compositions of the present disclosure have, in one aspect, an L* value of 45 to 80. In yet another alternative aspect, the compositions of the present disclosure have, in one aspect, an L* value of 50 to 75. The "L* value" describes the lightness-darkness property. If the L* value:0, the object is black. If the L* value:100 the object is white. The L* value is always positive. Compositions having an L* value further away from the extremes (0 and 100) have a more natural color, which may be the selected color for a specific application or which may enable the composition to be more easily colored. L* is measured using ASTM 2244 With 10 degree observer; D65 illuminant; SCI reflectance; and large aperture). The compositions having a L* of 40 to 85 results in the compositions having color space that could be achieved based on this light color naturally in the range of from 28 to 94. As used herein, the L* of the material naturally is the value of material without any colorant. Having values further away from 0 for L* results in a composition that has a much wider "color space". The "color space" is the range of L* that can be achieved using an optional colorant, pigment and/or dye. The compositions of the present disclosure have a much larger color space as compared to prior art LDS compositions, such that the compositions of the present disclosure are colorable.

The color properties of the composition may also be defined using the a* and b* values. The a* value describes the position on a red-green axis. If a* is positive, the shade is red and if a* is negative, the shade is green. The b* value describes the position on a yellow-blue axis. If b* is positive, the shade is yellow and if b* is negative, the shade is blue. When a* and b* are near zero and L is bigger, the result is a lighter color for the composition. For compositions of the present disclosure, it is beneficial for the a* and b* values naturally occurring in the compositions to be closer to zero since, as before, this enables a much larger color space to be achieved. In one aspect, the compositions have an a* value of from −5 to 0 or from −1 to −5 and a b* value of from −10 to 30 or from −5 to 20. This results in a color space capable of being achieved by the compositions of −50 to 52 for a* and −40 to 80 for b*. Again, as may be seen, since the compositions of the present disclosure utilize an LDS additive that is not darker in nature, a much wider array of color possibilities is possible. ASTM 2244 is also used to determine a* and b* values.

In various aspects, the present disclosure pertains to and includes at least the following aspects.

Aspect 1. A thermoplastic composition comprising, consisting of, or consisting essentially of:
(a) about 15 wt % to about 95 wt % polymer component comprising:
  (i) either
    about 20 wt % to about 85 wt % poly(p-phenylene oxide) and about 10 wt % to about 65 wt % flow promoter or
    about 70 wt % to 100 wt % polypropylene, said polypropylene being homopolymer and/or copolymer; and
  (ii) greater than about 0 wt % to about 30 wt % impact modifier;
(b) about 2 wt % to about 50 wt % of a laser activatable additive having a core-shell structure, wherein the core comprises an inorganic filler and the shell comprises a laser activatable component; and
(c) about 3 wt % to about 70 wt % inorganic fillers;
wherein the weight percent values of (a), (b) and (c) are based on the total weight of the composition and the combined weight percent value of all the components does not exceed 100 wt %.

Aspect 2. The thermoplastic composition of Aspect 1, comprising about 20 wt % to about 85 wt % poly(p-phenylene oxide) and about 10 wt % to about 65 wt % flow promoter.

Aspect 3. The thermoplastic composition of Aspect 1, comprising about 70 wt % to 100 wt % polypropylene.

Aspect 4. The thermoplastic composition of any one of Aspects 1-3, wherein the flow promoter comprises one or both of polystyrene and polypropylene.

Aspect 5. The thermoplastic composition of any one of Aspects 1-4, wherein the impact modifier comprises one or more of styrene-ethylene/1-butene-styrene (SEBS), styrene-butadiene-styrene (SBS), and styrene-ethylene-propylene-styrene (SEPS).

Aspect 6. The thermoplastic composition of any one of Aspects 1-5, wherein polypropylene is a homopolymer or a copolymer Aspect 7. The thermoplastic composition of any one of Aspects 1-6, wherein the core of the core-shell structure comprises $TiO_2$, mica or talc.

Aspect 8. The thermoplastic composition of any one of Aspects 1-7, wherein the shell of the core-shell structure comprises a tin-antimony oxide or copper hydroxide phosphate compound.

Aspect 9. The thermoplastic composition of any one of Aspects 1-8, wherein the weight ratio of the core in the core-shell structure is about 10 wt % to about 80 wt %

Aspect 10. The thermoplastic composition of any one of Aspects 1-9, said core comprising from about 45 wt % to about 65 wt % $TiO_2$ based on the weight of the laser activatable additive and said shell comprising from about 35 wt % to about 55 wt % of the weight of Tin-Antimony Cassiterite Grey [$(Sb/Sn)O_2$] based on the weight of the laser activatable additive.

Aspect 11. The thermoplastic composition of any one of Aspects 1-10, wherein the inorganic filler comprises $BaTiO_3$ or $TiO_2$ Aspect 12. The thermoplastic composition of any one of Aspects 1-11, comprising about 5 wt % to about 50 wt % filler Aspect 13. The thermoplastic composition of any one of Aspects 1-9, wherein the thermoplastic composition has a dielectric constant when measured at 1.1 GHz of at least 3.0 and a dissipation factor (Df) of less than $2.0 \times 10^{-3}$.

Aspect 14. The thermoplastic composition of any one of Aspects 1-13, comprising
(a) about 65 wt % to about 80 wt % polymer component;
(b) about 5 wt % to about 15 wt % of a laser activatable additive having a core-shell structure, wherein the core comprises an inorganic filler and the shell comprises a laser activatable component; and
(c) about 5 wt % to about 30 wt % inorganic filler.

Aspect 15. An article comprising a thermoplastic composition of any one of Aspects 1-14.

Aspect 16. The article of Aspect 15, wherein the article is selected from a computer device, electromagnetic interference device, printed circuit, Wi-Fi device, Bluetooth device, GPS device, cellular antenna device, smart phone device, automotive device, medical device, sensor device, security device, shielding device, RF antenna device, LED device and RFID device Aspect 17. The article of Aspect 15 or Aspect 16, wherein the article is a component of a cell phone antenna Aspect 18. A method of improving thermal conductivity properties of a blended thermoplastic composition, the method comprising, consisting of, or consisting essentially of the step of combining:

(a) about 15 wt % to about 95 wt % polymer component comprising:
(i) either
about 20 wt % to about 85 wt % poly(p-phenylene oxide) and about 10 wt % to about 65 wt % flow promoter or
about 70 wt % to 100 wt % polypropylene, said polypropylene being homopolymer and/or copolymer; and
(ii) about 0 wt % to about 30 wt % impact modifier;
(b) about 2 wt % to about 50 wt % of a laser activatable additive having a core-shell structure; and
(c) about 3 wt % to about 70 wt % inorganic filler.

Aspect 19. A method of manufacturing an article comprising:
molding an article from the composition of Aspect 1;
exposing the laser activatable additive to a laser to form an activated area; and
plating a metal layer onto the activated area.

Without further elaboration, it is believed that one skilled in the art can, using the description herein, utilize the present disclosure. The following examples are included to provide addition guidance to those skilled in the art of practicing the claimed disclosure. The examples provided are merely representative of the work and contribute to the teaching of the present disclosure. Accordingly, these examples are not intended to limit the disclosure in any manner.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. Unless indicated otherwise, percentages referring to composition are in terms of wt %.

There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

All samples were prepared by melt extrusion on a Toshiba Twin screw extruder, using different melt temperature and RPM according to different polymer components. Tests were all conducted in accordance with ASTM standards, referenced in each test below.

The special gravity ("SG") was determined in accordance with ASTM D792.

Melt Volume-flow Rate ("MVR") was determined in accordance with ASTM D1238 under a load of 5.0 kilogram (kg) and at 300 degrees Celsius (° C.).

Izod impact strength was determined at 23° C. and −20° C. on 3.2 millimeter (mm) thick injection molded samples in accordance with ASTM D256 (notched Izod impact strength, "NII"), and in accordance with ASTM D4812 (unnotched Izod impact strength, "UII").

Tensile testing was carried out at 50 millimeter per minute (mm/min) at 23° C. on standard tensile injection molded bars in accordance with ASTM D638.

Flexural testing was carried out at 1.27 mm/min and 3.2 mm thick injection molded sample in accordance with ASTM D790.

Heat deflection temperature ("HDT") was determined at 0.45 megapascals (MPa) on injection molded samples (127*12.7*3.2 mm bars) in accordance with ASTM D648.

Plating index was determined in accordance with ASTM B568 by testing the copper thickness using X-Ray Fluorescence ("XRF"). Briefly, LDS is carried out on molded plaques with laser power, frequency, and speed varied as indicated. A reference sample for XRF determinations was prepared using Pocan® DP 7102 with copper plating at about 5 µm. Copper thickness was determined on the reference sample on both sides and at four discrete sample points. The copper thickness values were averaged for the reference sample and the average value is referred to $X_{ref}$. The plating index is defined by the following equation:

$$\text{Plating Index} = \frac{\text{Average copper thickness for one parameter field}}{\text{Average copper thickness for reference sick } X_{ref}}$$

Heat deflection temperature ("HDT") was determined at 1.82 MPa on injection molded samples (127*12.7*3.2 mm bars) in accordance with ASTM D648.

Table 1 lists a typical extrusion profile of the compositions disclosed herein. Screw speed is in revolutions per minute (rpm) and throughput is in kilograms per hour (kg/hr).

TABLE 1

Typical extrusion profile of PPO based compositions

| Parameters | Unit | Polyphenylene Oxide (PPO) |
|---|---|---|
| Compounder Type | NONE | TEM-37BS |
| Barrel Size | mm | 1500 |
| Die | mm | 4 |
| Zone 1 Temp | ° C. | 90 |
| Zone 2 Temp | ° C. | 150 |
| Zone 3 Temp | ° C. | 270 |
| Zone 4 Temp | ° C. | 270 |
| Zone 5 Temp | ° C. | 280 |
| Zone 6 Temp | ° C. | 280 |
| Zone 7 Temp | ° C. | 280 |
| Zone 8 Temp | ° C. | 290 |
| Zone 9 Temp | ° C. | 290 |
| Zone 10 Temp | ° C. | 290 |
| Zone 11 Temp | ° C. | 290 |
| Die Temp | ° C. | 290 |
| Screw speed | rpm | 300 |
| Throughput | kg/hr | 30 |
| Torque | NONE | 45-55 |
| Vacuum 1 | MPa | −0.08 |
| Side Feeder 1 speed | rpm | 250 |
| Melt temperature | NONE | 280-290 |

Table 2 lists a typical molding profile for the disclosed compositions. Pressures are in kilogram-force per square centimeter (kgf/cm²)

TABLE 2

Typical molding profile of PPO based compositions

| Parameters | Unit | Polyphenylene Oxide (PPO) |
|---|---|---|
| Cnd: Pre-drying time | Hour | 3 |
| Cnd: Pre-drying temp | ° C. | 105 |
| Molding Machine | NONE | FANUC, ES3000 |
| Mold Type (insert) | NONE | ASTM tensile, flexural, and Izod bars; Color chips; 150 mm × 150 mm × 2.0 mm plaques |
| Hopper temp | ° C. | 50 |
| Zone 1 temp | ° C. | 270-280 |
| Zone 2 temp | ° C. | 280-290 |
| Zone 3 temp | ° C. | 290-300 |
| Nozzle temp | ° C. | 280-290 |
| Mold temp | ° C. | 90-120 |
| Screw speed | rpm | 100 |
| Back pressure | kgf/cm² | 90 |
| Cooling time | s | 15-20 |
| Injection speed | mm/s | 25-100 |
| Holding pressure | kgf/cm² | 600-1000 |
| Max. Injection pressure | kgf/cm² | 800-1500 |

LDS capable thermoplastics with good dielectric properties and good ductility were developed based on the building blocks of polymer component (PPO or PP or the mixture), impact modifier (e.g. SEBS), flow promoter (e.g. PS), inorganic filler (e.g. TiO₂), and a LDS additive with core-shell structure. This LDS additive comes from Merck with the trade name of Iriotec® 8850. TiO₂ (rutile) was used as the core with the weight ratio (wt %) from 45% to 65%. Tin-Antimony Cassiterite Grey [(Sb/Sn)O2, a laser activatable component] was the shell material with the wt % from 35% to 55%. The developed compositions show satisfied LDS capability, good impact property, and good processing performance. Meanwhile, Dk of the compositions was tunable via changing the loading of the inorganic filler, and Df could be kept at a low level, that is, less than 0.002 at 1.1 GHz.

The developed formulations using PPO/PS/SEBS as the polymer component are listed in Table 3 (see E1.1 and E1.2). C1.1 is the control sample, which uses the copper hydroxide phosphate as the LDS additive.

TABLE 3

Formulations of the LDS capable compositions with good dielectric performance and ductility

| Item Description | Unit | C1.1 | E1.1 | E1.2 |
|---|---|---|---|---|
| PPO, .46IV | wt % | 60.7 | 60.7 | 60.7 |
| SEBS, low Mw, high flow | wt % | 8 | 8 | 8 |
| GPPS | wt % | 13 | 13 | 13 |
| Bright white TiO₂ pigment | wt % | 14 | 9 | 7 |
| Copper hydroxide phosphate | wt % | 3 | | |
| TiO2 coated with (Sn/Sb)O2 | wt % | | 8 | 10 |
| LLDPE | wt % | 1 | 1 | 1 |
| MAG OXIDE | wt % | 0.1 | 0.1 | 0.1 |
| Zinc sulfide | wt % | 0.1 | 0.1 | 0.1 |
| Phosphite Stabilizer | wt % | 0.1 | 0.1 | 0.1 |

Physical, dielectric, and the detailed plating performance of the developed LDS capable compositions with good dielectric property and good ductility are listed in Table 4 and Table 5, respectively.

Copper hydroxide phosphate is a popular LDS additive, which has been applied in many commercial LDS grades. As shown in C1.1, when using copper hydroxide phosphate as the LDS additive, room temperature notched Izod of the control sample was only 155 J/m with 0% ductility. However, when the core-shell LDS additive (F598850) was applied in the formulation, the developed composition could show much better impact performance with the room temperature notched Izod as high as 552 Jim and 100% ductility (E1.1). Moreover, for the other mechanical, thermal, and flow performance properties, the developed composition was also better than the control sample (E1.1 vs. C1.1).

For the dielectric property, formulation with the LDS additive also showed satisfied performance. The dielectric constant (Dk) of the developed composition listed in E1.1 was 3.103 at 1.1 GHz, a little higher than that of the control in C1.1 (Dk=3.023). However, dissipation factor (Df) of the composition was not as good as that of the control, but the performance was still good, with a Df of 1.55E-3 at 1.1 GHz.

Plating performance of the developed compositions was determined by the plating index (PI). As shown in Table 5, the average plating index of the developed formulation was 0.54, a little lower than that of the control, indicating that the developed composition was LDS capable. Plating performance of the developed composition could be further improved by increasing the loading of the LDS additive. As shown in E1.2, when the loading of the LDS additive was increased from 8% to 10%, PI result of the composition was increased to 0.75, indicative of the good plating performance. Meanwhile, ductility of the improved composition was still much better than that of the control.

Importantly for the developed PPO based compositions, a higher L value was obtained (80.5 vs. 76.6 in Table 4), meaning that the colorability of the developed composition was a little better than that of the conventional one.

TABLE 5

Plating performance of the LDS capable compositions with good dielectric performance & ductility

| Power (W) | Frequency (KHz) | Speed (m/s) | C1.1 | E1.1 | E1.2 |
|---|---|---|---|---|---|
| 10 | 100 | 2 | 0.34 | 0.54 | 0.62 |
| 10 | 70 | 2 | 0.13 | 0.44 | 0.62 |
| 10 | 40 | 2 | 0.03 | 0.42 | 0.90 |
| 2 | 100 | 2 | 0.32 | 0.33 | 0.29 |
| 2 | 70 | 2 | 0.61 | 0.49 | 0.75 |
| 2 | 40 | 2 | 0.90 | 0.55 | 0.80 |
| 7 | 80 | 4 | 0.85 | 0.71 | 0.93 |
| 5 | 80 | 4 | 0.87 | 0.45 | 0.85 |
| 3 | 80 | 4 | 0.40 | 0.20 | 0.37 |
| 3 | 100 | 2 | 0.81 | 0.36 | 0.87 |
| 3 | 70 | 2 | 0.94 | 0.47 | 0.95 |
| 3 | 40 | 2 | 0.90 | 0.66 | 0.96 |
| 5 | 100 | 4 | 0.89 | 1.00 | 0.89 |
| 3 | 100 | 4 | 0.19 | 0.27 | 0.15 |
| 9 | 80 | 4 | 0.83 | 0.65 | 0.94 |
| 5 | 100 | 2 | 0.72 | 0.49 | 0.61 |
| 5 | 70 | 2 | 0.70 | 0.54 | 0.85 |
| 5 | 40 | 2 | 0.76 | 0.71 | 0.89 |
| 11 | 100 | 4 | 0.83 | 0.91 | 0.92 |
| 9 | 100 | 4 | 0.83 | 0.72 | 0.90 |
| 7 | 100 | 4 | 0.94 | 0.61 | 0.92 |
| 8 | 100 | 2 | 0.53 | 0.48 | 0.58 |
| 8 | 70 | 2 | 0.32 | 0.45 | 0.68 |
| 8 | 40 | 2 | 0.19 | 0.47 | 0.86 |

LDS capable thermoplastics with higher dielectric constant and good impact performance are listed in Table 6. By increasing the loading of inorganic filler (e.g. $TiO_2$), Dk of the composition was increased to be higher than 4 (see E2.1 and E2.2). Meanwhile, ductility of the developed compositions was still good. The corresponding control samples, which used the copper hydroxide phosphate as the LDS additive, were listed in C2.1 and C2.2, respectively.

TABLE 4

Properties of the LDS capable compositions with good dielectric performance and ductility

| Typical Property | Test Method | Test Description | Unit | C1.1 | E1.1 | E1.2 |
|---|---|---|---|---|---|---|
| Density | Specific Gravity | ASTM D792 | g/cm³ | 1.209 | 1.210 | 1.201 |
| MVR | 300° C./5.0 kg | ASTM D1238 | cm³/10 min | 5.2 | 9.9 | 11.1 |
| Notched IZOD | 23° C., 5 lbf/ft | ASTM D256 | J/m | 155 | 552 | 269 |
| Ductility | 23° C., 5 lbf/ft | ASTM D256 | % | 0 | 100 | 60 |
| Notched IZOD | −20° C., 5 lbf/ft | ASTM D256 | J/m | 100 | 125 | 110 |
| HDT | 0.45 MPa/3.2 mm | ASTM D648 | ° C. | 166 | 168 | 165 |
| Flexural Modulus | 3.2 mm, 1.27 mm/min | ASTM D790 | MPa | 1870 | 2010 | 1890 |
| Flexural Strength | @yield, 3.2 mm, 1.27 mm/min | ASTM D790 | MPa | 75 | 84 | 79 |
| Flexural Strength | @break, 3.2 mm, 1.27 mm/min | ASTM D790 | MPa | 73 | 82 | 77 |
| Tensile Modulus | 50 mm/min | ASTM D638 | MPa | 2024 | 2197 | 2037 |
| Tensile Strength | @yield, 50 mm/min | ASTM D638 | MPa | / | 57 | 54 |
| Tensile Elongation | @yield, 50 mm/min | ASTM D638 | % | / | 9.8 | 9.5 |
| Tensile Strength | @break, 50 mm/min | ASTM D638 | MPa | 50 | 44 | 50 |
| Tensile Elongation | @break, 50 mm/min | ASTM D638 | % | 6.9 | 31.7 | 23.7 |
| Color | L | | / | 76.6 | 80.5 | |
| | a | | / | 1.4 | −2.3 | |
| | b | | / | 4.3 | 4.0 | |
| Dk | 1.1 GHz | SABIC Method | / | 3.023 | 3.103 | 3.073 |
| Df | 1.1 GHz | SABIC Method | / | 1.03E−3 | 1.55E−3 | 1.68E−3 |
| Dk | 1.9 GHz | SABIC Method | / | 3.030 | 3.107 | 3.093 |
| Df | 1.9 GHz | SABIC Method | / | 1.24E−3 | 1.98E−3 | 2.21E−3 |
| PI-Avg | Plating Index | | / | 0.62 | 0.54 | 0.75 |

Note:

SABIC Method means Dk, Df were measured using a QWED split post dielectric resonator and Agilent PNA network analyzer. For 1.1 GHz measurement, minimum sample size is 120 mm*120 mm, maximum sample thickness is 6 mm. For 1.9 GHz measurement, minimum sample size is 70 mm*70 mm, maximum sample thickness is 4 mm. The test samples were prepared from injection molding according to the above standards. Plating index (PI) is an index that is applied to evaluate the plating performance. It is a relative value of the metal thickness of the test sample to the standard one, which was tested by X-ray fluorescence technology. The higher the PI, the better the plating performance.

TABLE 6

Formulation of LDS capable compositions with
good dielectric performance and ductility

| Item Description | Unit | C2.1 | C2.2 | E2.1 | E2.2 |
|---|---|---|---|---|---|
| PPO, .46IV | wt % | 49.7 | 42.7 | 49.7 | 42.7 |
| SEBS, low Mw, high flow | wt % | 8 | 9 | 8 | 9 |

TABLE 6-continued

Formulation of LDS capable compositions with
good dielectric performance and ductility

| Item Description | Unit | C2.1 | C2.2 | E2.1 | E2.2 |
|---|---|---|---|---|---|
| GPPS | wt % | 11 | 9 | 11 | 9 |
| Bright white $TiO_2$ pigment | wt % | 27 | 35 | 22 | 30 |
| Copper hydroxide phosphate | wt % | 3 | 3 | | |
| TiO2 coated with $(Sn/Sb)O_2$ | wt % | | | 8 | 8 |
| LLDPE | wt % | 1 | 1 | 1 | 1 |
| MAG OXIDE | wt % | 0.1 | 0.1 | 0.1 | 0.1 |
| Zinc sulfide | wt % | 0.1 | 0.1 | 0.1 | 0.1 |
| Phosphite Stabilizer | wt % | 0.1 | 0.1 | 0.1 | 0.1 |

Physical, dielectric, and the detailed plating performance of the developed LDS compositions with higher Dk are listed in Table 7 and Table 8, respectively. Taking the compositions with the Dk value around 4 as the example, as shown in Table 7, when using Iriotec® 8850 as the LDS additive, impact performance of the developed composition (see E2.2, NII=160 J/m) could be much higher than that with the conventional LDS additive copper hydroxide phosphate (see C2.2, NII=115 J/m). Similar results could be obtained for the low temperature impact performance at −20° C. Meanwhile, the developed composition also showed some advantage on the other mechanical, thermal, and flow performance properties.

For the dielectric property, good results were obtained. As shown in Table 7, Dk of the developed composition (4.097 at 1.1 GHz) could be a little higher than that of the control (3.867 at 1.1 GHz) even though the two samples had similar overall loading of the inorganic filler ($TiO_2$ in the example). Meanwhile, for the Df of the developed composition, it was kept at a relatively low level, only 1.67E-3 at 1.1 GHz.

For the plating performance, as shown in Table 8, PI results of the developed compositions could be around 0.7 or higher, meaning that the developed compositions have good plating performance.

TABLE 7

Properties of the LDS capable compositions with good dielectric performance and ductility

| Typical Property | Test Method | Test Description | Unit | C2.1 | C2.2 | E2.1 | E2.2 |
|---|---|---|---|---|---|---|---|
| Density | Specific Gravity | ASTM D792 | g/cm3 | 1.345 | 1.448 | 1.353 | 1.457 |
| MVR | 300° C./5.0 kg | ASTM D1238 | $cm^3$/10 min | 2.8 | 1.5 | 8.4 | 7.4 |
| Notched IZOD | 23° C., 5 lbf/ft | ASTM D256 | J/m | 132 | 115 | 201 | 160 |
| Ductility | 23° C., 5 lbf/ft | ASTM D256 | % | 0 | 0 | 100 | 40 |
| Notched IZOD | −20° C., 5 lbf/ft | ASTM D256 | J/m | 115 | 108 | 137 | 140 |
| HDT | 0.45 MPa/3.2 mm | ASTM D648 | ° C. | 167 | 167 | 168 | 169 |
| Flexural Modulus | 3.2 mm, 1.27 mm/min | ASTM D790 | MPa | 2040 | 1980 | 2140 | 2020 |
| Flexural Strength | @yield, 3.2 mm, 1.27 mm/min | ASTM D790 | MPa | 73 | 63 | 80 | 70 |
| Flexural Strength | @break, 3.2 mm, 1.27 mm/min | ASTM D790 | MPa | 72 | 62 | 79 | 69 |
| Tensile Modulus | 50 mm/min | ASTM D638 | MPa | 2204 | 2142 | 2329 | 2206 |
| Tensile Strength | @yield, 50 mm/min | ASTM D638 | MPa | / | / | 51 | 43 |
| Tensile Elongation | @yield, 50 mm/min | ASTM D638 | % | / | / | 6.1 | 6.4 |
| Tensile Strength | @break, 50 mm/min | ASTM D638 | MPa | 45 | 37 | 44 | 42 |
| Tensile Elongation | @break, 50 mm/min | ASTM D638 | % | 4.8 | 4.2 | 6.8 | 6.7 |
| Color | L | | / | 80.7 | 82.1 | 84.7 | 85.9 |
| | a | | / | 0.8 | 0.6 | −2.2 | −2.2 |
| | b | | / | 3.3 | 2.8 | 2.9 | 2.7 |
| Dk | 1.1 GHz | SABIC Method | / | 3.45 | 3.867 | 3.630 | 4.097 |
| Df | 1.1 GHz | SABIC Method | / | 1.07E−3 | 1.15E−3 | 1.48E−3 | 1.67E−3 |
| Dk | 1.9 GHz | SABIC Method | / | 3.473 | 3.887 | 3.647 | 4.113 |
| Df | 1.9 GHz | SABIC Method | / | 1.27E−3 | 1.36E−3 | 2.02E−3 | 2.29E−3 |
| PI-Avg | Plating Index | | / | 0.89 | 0.89 | 0.75 | 0.68 |

Note:
SABIC Method means Dk, Df were measured using a QWED split post dielectric resonator and Agilent PNA network analyzer. For 1.1 GHz measurement, minimum sample size is 120 mm*120 mm, maximum sample thickness is 6 mm. For 1.9 GHz measurement, minimum sample size is 70 mm*70 mm, maximum sample thickness is 4 mm. The test samples were prepared from injection molding according to the above standards. Plating index (PI) is an index that is applied to evaluate the plating performance. It is a relative value of the metal thickness of the test sample to the standard one, which was tested by X-ray fluorescence technology. The higher the PI, the better the plating performance.

TABLE 8

Plating performance of the LDS capable compositions
with good dielectric performance & ductility

| Power (W) | Frequency (KHz) | Speed (m/s) | C2.1 | C2.2 | E2.1 | E2.2 |
|---|---|---|---|---|---|---|
| 10 | 100 | 2 | 0.85 | 0.79 | 0.67 | 0.62 |
| 10 | 70 | 2 | 0.77 | 0.68 | 0.69 | 0.57 |
| 10 | 40 | 2 | 0.72 | 0.78 | 0.64 | 0.54 |
| 2 | 100 | 2 | 0.91 | 0.88 | 0.65 | 0.36 |
| 2 | 70 | 2 | 1.03 | 0.96 | 0.84 | 0.48 |
| 2 | 40 | 2 | 0.96 | 0.81 | 1.14 | 0.73 |
| 7 | 80 | 4 | 1.05 | 0.92 | 0.78 | 0.93 |
| 5 | 80 | 4 | 1.02 | 0.93 | 0.86 | 0.70 |
| 3 | 80 | 4 | 0.90 | 0.79 | 0.59 | 0.58 |
| 3 | 100 | 2 | 1.05 | 1.01 | 0.71 | 0.64 |
| 3 | 70 | 2 | 1.04 | 0.95 | 0.79 | 0.64 |
| 3 | 40 | 2 | 0.97 | 0.90 | 1.11 | 1.05 |
| 5 | 100 | 4 | 1.02 | 0.96 | 0.93 | 0.94 |
| 3 | 100 | 4 | 0.71 | 0.82 | 0.53 | 0.55 |
| 9 | 80 | 4 | 0.97 | 1.01 | 0.65 | 0.71 |
| 5 | 100 | 2 | 0.90 | 0.97 | 0.66 | 0.65 |
| 5 | 70 | 2 | 0.86 | 0.93 | 0.80 | 0.64 |
| 5 | 40 | 2 | 0.89 | 0.91 | 0.96 | 0.87 |
| 11 | 100 | 4 | 0.86 | 1.02 | 0.60 | 0.73 |
| 9 | 100 | 4 | 0.92 | 0.97 | 0.61 | 0.75 |
| 7 | 100 | 4 | 0.97 | 0.96 | 0.69 | 0.80 |
| 8 | 100 | 2 | 0.67 | 0.84 | 0.62 | 0.61 |
| 8 | 70 | 2 | 0.61 | 0.82 | 0.65 | 0.59 |
| 8 | 40 | 2 | 0.69 | 0.86 | 0.86 | 0.62 |

LDS capable thermoplastics with good dielectric property and good ductility have been developed based on the building blocks of polymer component (PPO or PP or the mixture), impact modifier (e.g. SEBS), flow promoter (e.g. PS), inorganic filler (e.g. $TiO_2$), and a LDS additive with core-shell structure. The developed compositions showed satisfied LDS performance and quite good ductility (high impact strength and high tensile elongation). Dk of the composition was variable, changing from 2.6 to 8 at 1.1 GHz, while Df could be kept at a low level, that is, less than 0.002 at 1.1 GHz.

The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A thermoplastic composition comprising:
   (a) about 15 wt % to about 95 wt % polymer component comprising:
      (i) either
         about 20 wt % to about 85 wt % poly(p-phenylene oxide) and about 10 wt % to about 65 wt % flow promoter or
         about 70 wt % to 100 wt % polypropylene, said polypropylene being homopolymer and/or copolymer; and
      (ii) greater than about 0 wt % to about 30 wt % impact modifier;
   (b) about 2 wt % to about 50 wt % of a laser activatable additive having a core-shell structure, wherein the core comprises an inorganic filler and the shell comprises a laser activatable component; and
   (c) about 3 wt % to about 70 wt % inorganic fillers,
   wherein the weight percent values of (a), (b) and (c) are based on the total weight of the composition and the combined weight percent value of all the components does not exceed 100 wt %, and
   wherein the thermoplastic composition has a dielectric constant when measured at 1.1 GHz of at least 3.0 and a dissipation factor (Df) of less than $2.0 \times 10^{-3}$.

2. The thermoplastic composition of claim 1, comprising about 20 wt % to about 85 wt % poly(p-phenylene oxide) and about 10 wt % to about 65 wt % flow promoter.

3. The thermoplastic composition of claim 1, comprising about 70 wt % to 100 wt % polypropylene.

4. The thermoplastic composition of claim 1, wherein the flow promoter comprises one or both of polystyrene and polypropylene.

5. The thermoplastic composition of claim 1, wherein the impact modifier comprises one or more of styrene-ethylene/1-butene-styrene (SEBS), styrene-butadiene-styrene (SBS), and styrene-ethylene-propylene-styrene (SEPS).

6. The thermoplastic composition of claim 1, wherein polypropylene is a homopolymer or a copolymer.

7. The thermoplastic composition of claim 1, wherein the core of the core-shell structure comprises $TiO_2$, mica or talc.

8. The thermoplastic composition of claim 1, wherein the shell of the core-shell structure comprises a tin-antimony oxide or copper hydroxide phosphate compound.

9. The thermoplastic composition of claim 1, wherein the weight ratio of the core in the core-shell structure is about 10 wt % to about 80 wt %.

10. The thermoplastic composition of claim 1, wherein the core comprises from about 45 wt % to about 65 wt % $TiO_2$ based on the weight of the laser activatable additive and the shell comprises from about 35 wt % to about 55 wt % Tin-Antimony Cassiterite Grey [$(Sb/Sn)O_2$] based on the weight of the laser activatable additive.

11. The thermoplastic composition of claim 1, wherein the inorganic filler comprises $BaTiO_3$ or $TiO_2$.

12. The thermoplastic composition of claim 1, comprising about 5 wt % to about 50 wt % filler.

13. The thermoplastic composition of claim 1, comprising
   (a) about 65 wt % to about 80 wt % polymer component;
   (b) about 5 wt % to about 15 wt % of a laser activatable additive having a core-shell structure, wherein the core comprises an inorganic filler and the shell comprises a laser activatable component; and
   (c) about 5 wt % to about 30 wt % inorganic filler.

14. An article comprising a thermoplastic composition of claim 1.

15. The article of claim 14, wherein the article is selected from a computer device, electromagnetic interference device, printed circuit, Wi-Fi device, Bluetooth device, GPS device, cellular antenna device, smart phone device, automotive device, medical device, sensor device, security device, shielding device, RF antenna device, LED device and RFID device.

16. The article of claim 14, wherein the article is a component of a cell phone antenna.

17. A method of improving thermal conductivity properties of a blended thermoplastic composition, the method comprising the step of combining:
   (a) about 15 wt % to about 95 wt % polymer component comprising:
      (i) either
         about 20 wt % to about 85 wt % poly(p-phenylene oxide) and about 10 wt % to about 65 wt % flow promoter or
         about 70 wt % to 100 wt % polypropylene, said polypropylene being homopolymer and/or copolymer; and
      (ii) about 0 wt % to about 30 wt % impact modifier;
   (b) about 2 wt % to about 50 wt % of a laser activatable additive having a core-shell structure; and
   (c) about 3 wt % to about 70 wt % inorganic filler,
   wherein the weight percent values of (a), (b) and (c) are based on the total weight of the composition and the combined weight percent value of all the components does not exceed 100 wt %, and
   wherein the thermoplastic composition has a dielectric constant when measured at 1.1 GHz of at least 3.0 and a dissipation factor (Df) of less than $2.0 \times 10^{-3}$.

18. A method of manufacturing an article comprising:
   molding an article from the composition of claim 1;
   exposing the laser activatable additive to a laser to form an activated area; and
   plating a metal layer onto the activated area.

* * * * *